(12) United States Patent
Robertson

(10) Patent No.: US 8,879,460 B2
(45) Date of Patent: *Nov. 4, 2014

(54) TELECOMMUNICATIONS SYSTEM AND METHOD

(75) Inventor: Robert Robertson, Maidenhead (GB)

(73) Assignee: Multitone Electronics PLC, Hampshire (GB)

( * ) Notice: Subject to any disclaimer, the term of this patent is extended or adjusted under 35 U.S.C. 154(b) by 1141 days.

This patent is subject to a terminal disclaimer.

(21) Appl. No.: 12/596,830

(22) PCT Filed: Apr. 9, 2008

(86) PCT No.: PCT/GB2008/001239
§ 371 (c)(1),
(2), (4) Date: May 6, 2010

(87) PCT Pub. No.: WO2008/139133
PCT Pub. Date: Nov. 20, 2008

(65) Prior Publication Data
US 2010/0208643 A1    Aug. 19, 2010

(30) Foreign Application Priority Data

May 16, 2007  (GB) .................................. 0709428.7

(51) Int. Cl.
*H04B 7/14* (2006.01)
*H04J 1/10* (2006.01)
*H04J 3/08* (2006.01)
*H04L 12/43* (2006.01)
*H04B 7/26* (2006.01)

(52) U.S. Cl.
CPC ............ *H04B 7/2656* (2013.01); *H04B 7/2606* (2013.01)
USPC ............................ 370/315; 370/501; 370/458

(58) Field of Classification Search
USPC ........................................................ 370/315
See application file for complete search history.

(56) References Cited

U.S. PATENT DOCUMENTS 5,034,945 A     7/1991  Kimoto et al.
5,263,177 A    11/1993  Schieve et al.
(Continued)

FOREIGN PATENT DOCUMENTS

EP      0497490 A2    8/1992
JP    2006262413 A    9/2006
(Continued)

OTHER PUBLICATIONS

Network Management System for Telecommunication and Internet Application, Author: Gerd Bumiller, Published: May 2003 http://web.archive.org/web/20030520124947/http://iad-de.com/plcsym/dlc3nmspaper01.pdf.*

*Primary Examiner* — Noel Beharry
(74) *Attorney, Agent, or Firm* — Haverstock & Owens LLP

(57) ABSTRACT

A telecommunications system for communicating data to and from a mobile device. The system comprises a plurality of repeater nodes disposed to form a network. Each repeater node has a transceiver unit operable to transmit the data with a first transmission power to one or more other of the repeater nodes within one of a plurality of slots of a time frame. Each repeater node is allocated a time slot, and the mobile device is arranged to transmit and receive data to and from the repeater nodes in the network. Each of the repeater nodes is operable to transmit a pilot signal during the same one of the time slots of the time frame with a second transmission power, the second power being less than the first transmission power. The pilot signal includes an identifier of the repeater node which is transmitted with the pilot signal and the mobile device is operable to receive one of the pilot signals and from the identifier included in the strongest pilot signal the mobile device can identify on of the repeater nodes to which to transmit and or receive data.

18 Claims, 7 Drawing Sheets

(56) References Cited

U.S. PATENT DOCUMENTS

| | | | |
|---|---|---|---|
| 5,392,287 A * | 2/1995 | Tiedemann et al. | 370/311 |
| 6,415,155 B1 * | 7/2002 | Koshima et al. | 455/456.1 |
| 7,283,787 B2 * | 10/2007 | Diao et al. | 455/11.1 |
| 2003/0157943 A1 * | 8/2003 | Sabat, Jr. | 455/456 |
| 2004/0165657 A1 * | 8/2004 | Simic et al. | 375/211 |
| 2005/0036470 A1 * | 2/2005 | Calvert | 370/338 |

FOREIGN PATENT DOCUMENTS

| | | |
|---|---|---|
| WO | 95/19688 A1 | 7/1995 |
| WO | 03/065757 A1 | 8/2003 |
| WO | 03/073643 A1 | 9/2003 |
| WO | 2004/095733 A2 | 11/2004 |
| WO | 2006/069859 A1 | 7/2006 |

* cited by examiner

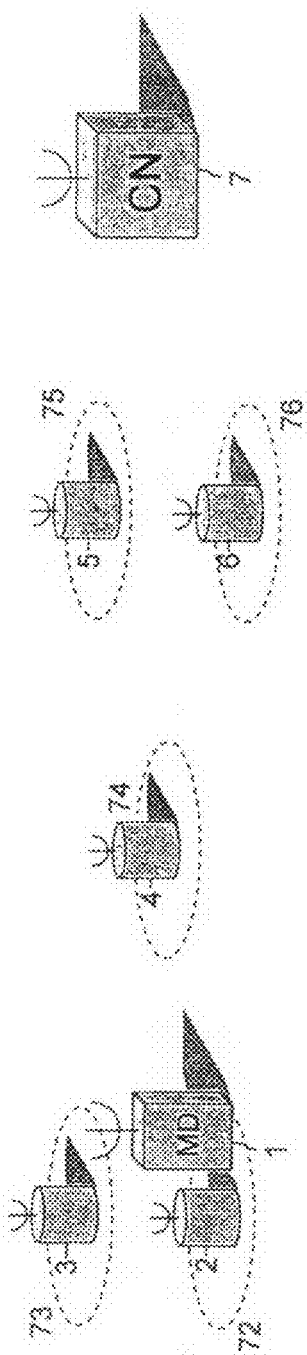

TELECOMMUNICATIONS SYSTEM AND METHOD

FIELD OF THE INVENTION

The present invention relates to a system and method for communicating data to and from a mobile device via a plurality of repeater nodes.

BACKGROUND OF THE INVENTION

Use of repeater nodes in telecommunication networks is well known. Typically the repeater nodes are stationed between a source node and a destination node to allow for data communicated from the source node to be communicated to the destination node over a distance that would otherwise be too great to maintain an acceptable signal quality if communication was made without the repeater nodes. A first repeater node conventionally receives the data being transmitted from the source node, performs any amplification which may be necessary due to a degradation of the signal, and transmits the amplified signal on to a second repeater node. The second repeater node in turn performs any amplification which may be necessary due to a degradation of the signal, transmits the amplified signal on to the next repeater node. This process will be repeated until a final repeater node transmits the data to the destination node. An advantage of systems that communicate data via repeater nodes is that a distance across which the source node and destination node can communicate can be increased beyond a distance that the source node and destination node would otherwise be able to communicate without the repeater nodes. Also a transmission method used by the repeater nodes for example a radio interface, need only have a maximum range of a distance between each of the repeater nodes. This allows for the use of transmission methods such as short range radio interfaces, for example Bluetooth, which may be particularly desirable because of low power consumption and minimal radio interference impact.

In one example of such a telecommunications network disclosed in our co-pending UK application number 0707924.7, repeater nodes are employed to communicate data between a mobile device and a control node. In order to enable efficient use of a radio interface used by the network, each repeater node is allocated a time slot of a time frame during which to transmit upstream or downstream data. Arranging the network so it uses a time division multiplex scheme such as this means that the network can operate on one frequency and provides an arrangement in which transceiver units of the repeater nodes need only transmit data at any one time slot and thus results in a lower power consumption of the repeater nodes.

As a result of a transmission range of a mobile device and the transceiver range of the repeater nodes, mobile devices will typically identify a nearest repeater node to which the mobile device should transmit and receive data. Therefore it can be desirable to arrange the network so that at any one time the mobile device has a designated repeater node to which it transmits data. When selecting a repeater node for the mobile device to communicate with, a repeater node is selected with which it shares the strongest radio link. This will typically be the repeater node nearest the mobile device but other factors may influence this such as interference and radio propagation effects. In one example the mobile device may identify the repeater node to which it should transmit and receive data, but in another example this might be selected by the network.

Providing an arrangement by which a mobile device can identify a most appropriate repeater node via which to transmit and receive data therefore represents a technical problem.

SUMMARY OF THE INVENTION

According to the present invention there is provided a telecommunications system for communicating data to and from a mobile device. The system comprises a plurality of repeater nodes disposed to form a network. Each repeater node has a transceiver unit operable to transmit the data with a first transmission power to one or more other of the repeater nodes within one of a plurality of slots of a time frame. Each repeater node is allocated one of the time slots of the time frame and the mobile device is arranged to transmit and receive data to and from one or more of the repeater nodes in the network in one of the time slots of the time frame. Each of the repeater nodes is operable to transmit a pilot signal during the same one of the time slots of the time frame with a second transmission power, the second power being less than the first transmission power. The pilot signal includes an identifier of the repeater node which is transmitted with the pilot signal and the mobile device is operable to receive the pilot signal from one of the repeater nodes and from the identifier included in the received pilot signal to transmit data to the repeater node identified by the identifier.

Embodiments of the present invention provide an arrangement in which, each repeater node transmits a pilot signal during a specified pilot signal time slot of the time frame. When transmitting the pilot signal, each repeater node includes an identifier of the repeater node. The mobile device is therefore able to identify a most appropriate repeater node with which to communicate. Because the pilot signal is transmitted by each repeater node at the same time and at a reduced power, the present invention is afforded a number of advantages Unlike known arrangements there is no requirement for a continuous pilot signal to be broadcast from each repeater node on a different radio channel to the main data bearing channel. This reduces the power consumption of the repeater nodes. Furthermore, as only one radio channel need be used for the entire system, this can reduce the complexity and cost of the transceiver units in the repeater nodes and the mobile device and further mitigate radio interference as only one radio channel is used for the system.

The power consumption of the mobile device is reduced because it need not continuously monitor a separate pilot signal channel for each repeater node. As each repeater node transmits its pilot signal within the same time slot, the mobile device need only be in a pilot signal receiving mode for the time period during which the pilot signals are transmitted, i.e. that of a single time slot. As a result a reduction in the power consumption of the mobile device is provided. Furthermore in some examples the power consumption of the mobile device may also be reduced because it need only ensure that data is transmitted with sufficient power to reach the nearest repeater node.

In some embodiments of the present invention, along with the identifier, each repeater node is operable to include information indicating the time slot of the time frame during which the repeater node transmits data. In this way, once the mobile device has determined which repeater node is transmitting the strongest pilot signal, the mobile device is able to identify the time period to receive the data corresponding to the data transmitting time slot of the selected repeater node. This can also reduce the power consumption of the mobile device, because the mobile device need only energise a receiver during a specific time slot.

In one example, a mobile device can transmit to only a single repeater node at any time. This transmission takes place during the single timeslot allocated to that repeater node. The first part of the timeslot is used for downstream transmissions by the repeater node and the second part of the timeslot used for upstream transmissions towards a control node of the network via the repeater node from a mobile device or other repeater node. Thus, only a single repeater node transmits during any given timeslot in the downstream direction. However, in the upstream direction a contended access mechanism allows more than a single device (mobile device or repeater node) to transmit to a repeater node during the repeater node's timeslot in the upstream direction.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which:

FIG. 7 provides a simplified diagram of further reduced power coverage areas provided by repeater nodes according to an embodiment of the present invention.

DESCRIPTION OF EXAMPLE EMBODIMENTS

Figure 1:
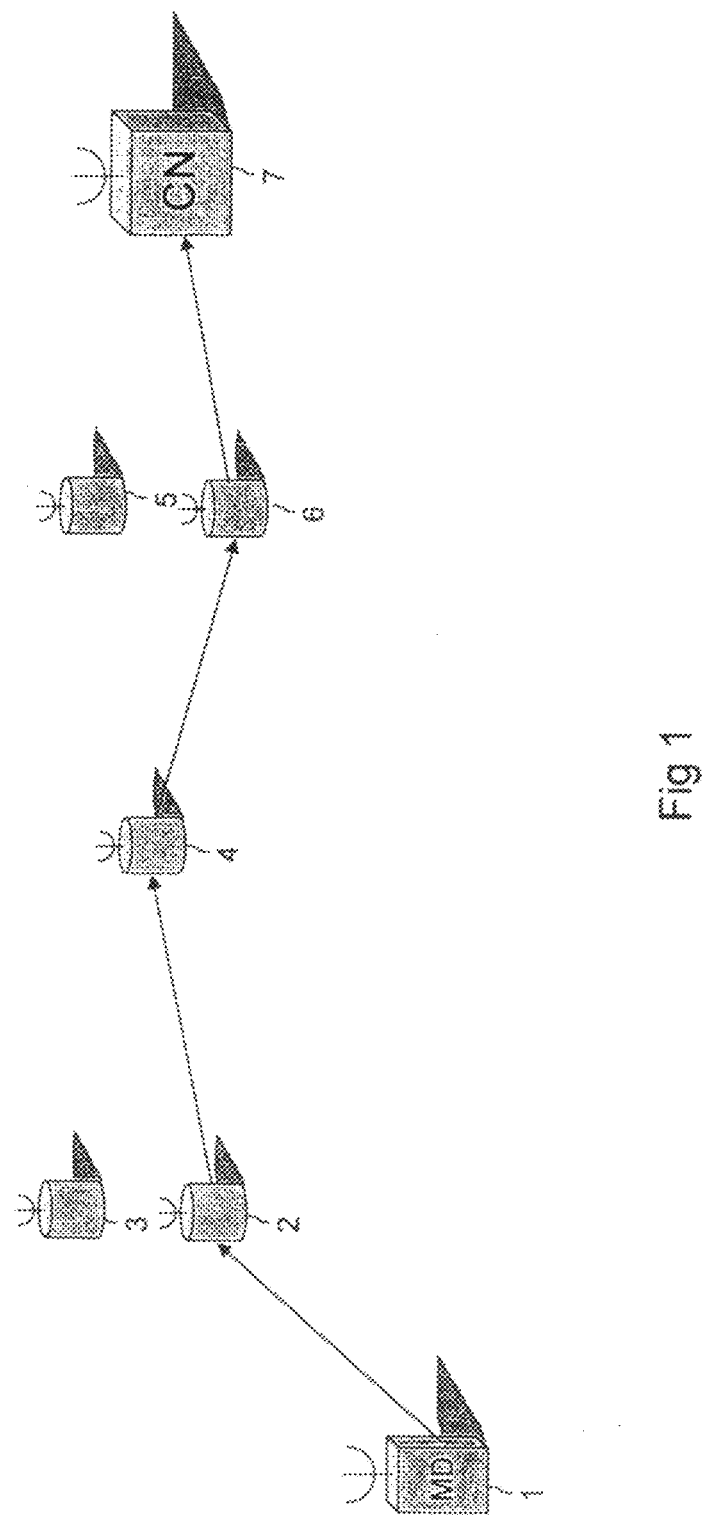
FIG. 1 provides a simplified diagram of upstream data transmission in a network according to the an embodiment of present invention.

FIG. 1 provides a diagram of a simplified network according to an embodiment of the present invention. A mobile device 1 communicates data to and from a control node 7 via a plurality of repeater nodes 2, 3, 4, 5, 6. In some embodiments of the invention disclosed in co-pending UK application number 0707924.7, the repeater nodes and the control node 7 form part of a self organising ad-hoc network. When the network is first established each repeater node is operable to identify a parent repeater node that is within a communication range and disposed between it and the control node 7. When the network is operational, the repeater node transmits upstream data to the parent repeater node. Furthermore, as will be discussed below, the mobile device 1 is operable to select a repeater node within a communication range and transmit upstream data to that selected repeater node. The selected repeater node then transmits the data it has received from the mobile device to its parent repeater node, and the selected repeater node's parent repeater node will duly transmit the data to its parent repeater node and so on until the data is finally transmitted to the control node 7. As is shown in FIG. 1, the mobile device 1 has selected a first repeater node 2 to which data is to be transmitted. The first repeater node 2 transmits the data to its parent repeated node 4, which in turn transmits the data to its repeater node 6 which transmits the data to the control node 7.

Figure 2:
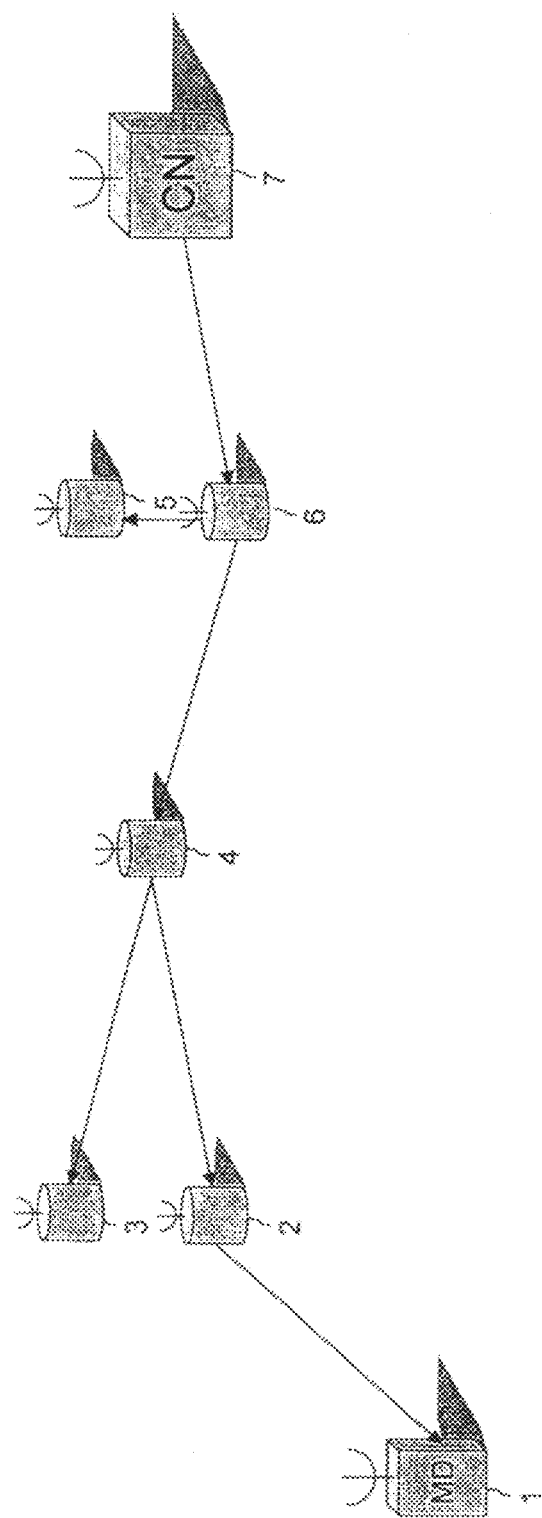
FIG. 2 provides a simplified diagram of downstream data transmission in a network according to the an embodiment of present invention.

FIG. 2 shows an embodiment of the invention in which downstream data is transmitted. The downstream data is transmitted to a first repeater node 6 which transmits the downstream data to a first 5 and a second 4 repeater node. The second repeater node then in turn transmits the data to a third 3 and a fourth repeater node 2. The fourth repeater node then transmits the data to the mobile device 1. In this way the downstream data may be propagated throughout the entire network, regardless of the location of the mobile device. This is an effective way of ensuring that, providing the mobile device 1 is in communication range of at least one repeater node it will always receive the downstream data.

Figure 3:
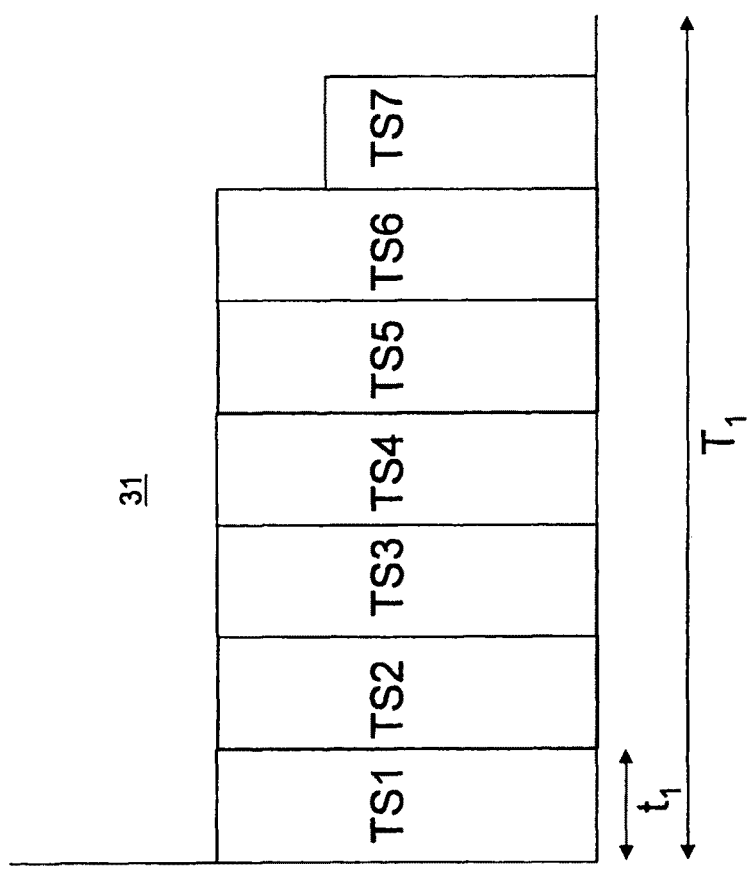
FIG. 3 provides a diagram of a time frame for communicating data in the network of FIG. 1 according to an embodiment of the present invention.

In embodiments of the present invention the communication of data in the network is governed by a time frame. FIG. 3 shows a diagram of a time frame 31 according to which the telecommunications system of FIGS. 1 and 2 communicates upstream data and downstream data. The time frame lasts for a duration of time $T_1$. The control node 7 and the plurality of repeater nodes 2, 3, 4, 5, 6 are each allocated time slots in the time frame 31 which lasts for a period $t_1$. The first repeater node 2 has a corresponding time slot TS1, the second repeater node 3 has a corresponding time slot TS2, the third repeater node 4 has a corresponding time slot TS3 etc. The control node 7 has a corresponding time slot TS6. The time frame 31 in this example includes a seventh time slot TS7, the purpose of which will be explained shortly. The telecommunication system is arranged such that each of the repeater nodes and the control node 7 will transmit downstream data to other repeater nodes during an allocated time slot and transmit upstream data during the allocated time slot of the node to which that repeater node is transmitting the upstream data. Therefore, mobile devices are not allocated a timeslot as they do not transmit in the downstream direction. In the upstream direction, transmission from any of the mobile device or the repeater nodes occurs during a second part of the timeslot allocated to the repeater node which is receiving the data.

In some embodiments the time frame 31 is ordered such that the time slots corresponding to parts of the telecommunication system that transmit upstream data directly to each other are arranged to be at a minimal time separation. Thus in the telecommunication system of FIG. 1, adjacent parts of the network can be arranged to have correspondingly adjacent time slots. Such an arrangement reduces the transmission in the upstream direction.

Figure 4:
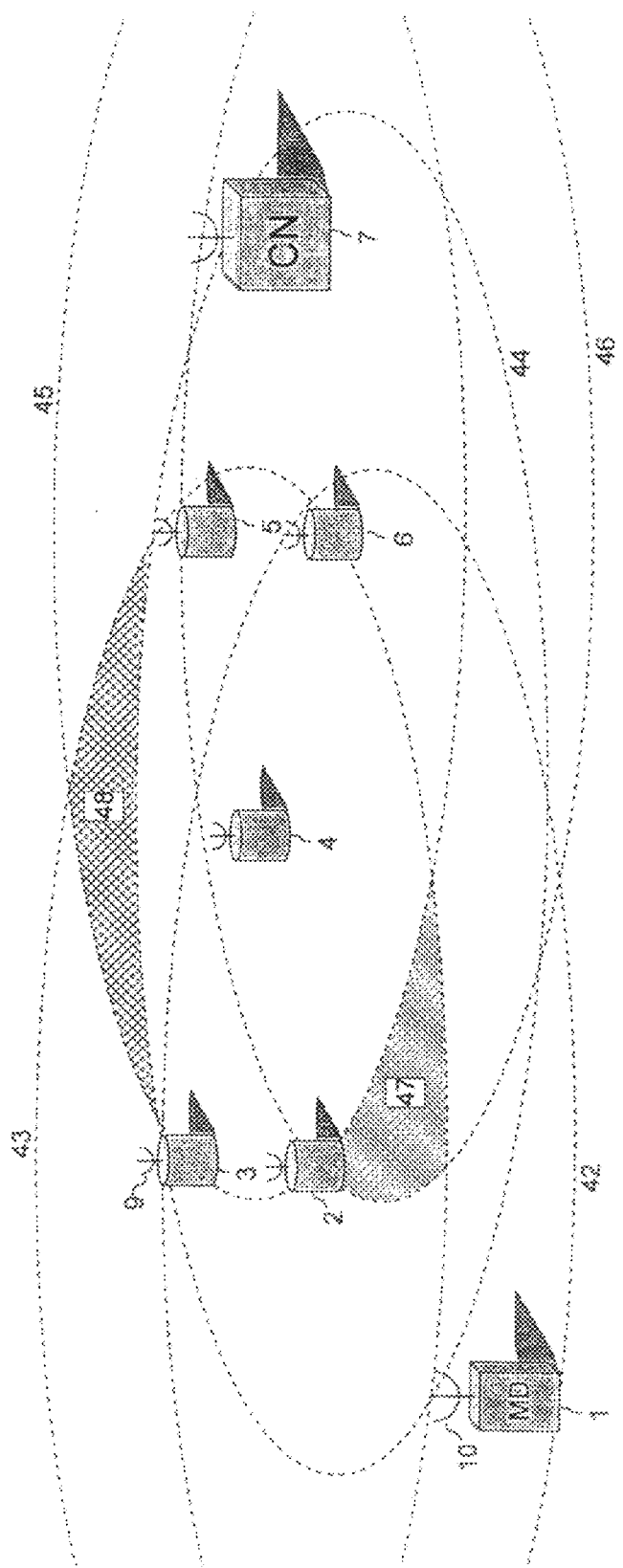
FIG. 4 provides a simplified diagram of coverage areas provided by repeater nodes according to an embodiment of the present invention.

FIG. 4 provides a simplified illustration of the coverage areas 42, 43, 44, 45, 46 provided by the repeater nodes 2, 3, 4, 5, 6. Each coverage area 42, 43, 44, 45, 46 defines an area within which data can be received by the mobile device 1 when transmitted by the repeater node and received by the repeater node when transmitted by the mobile device 1. This area will be determined by factors such as the power and sensitivity of the transceiver units 9 provided with the repeater nodes 2, 3, 4, 5, 6 and the transceiver unit 10 provided with the mobile device 1. As shown in FIG. 4 the mobile device 1 is in a first coverage area 42 provided by the first repeater node 2. When the mobile device 1 is in the location shown in FIG. 4, it is solely in the first coverage area 42 provided by the first repeater node 2. This means there is no choice but to transmit upstream data from the mobile device via the first control node 2. However, should the mobile device move to a second location within the indicated hashed area 47 then the mobile device 1 will be within the coverage area 42 of not only the first repeater node 2 but a coverage area 44 provided by a second repeater node 4 and a coverage area 46 provided by a third repeater node 6. Similarly should the mobile device move to a third location within the indicated cross hatched area 48 then the mobile device 1 will be within the coverage area 42 of not only the first repeater node 2 but a coverage area 43 provided by a fourth repeater node 3 and a coverage area 44 provided by the second repeater node 6. If the mobile device 1 moves to the second location 47 or the third location 48 then there are more than one potential repeater nodes to which the mobile device 1 can transmit upstream data.

As explained above it can be more efficient from the perspective of radio interference, power consumption and data processing to arrange the network so that the mobile device 1 transmits upstream data to a specific repeater node. Rather than several repeater nodes receiving data from the mobile device 1 and transmitting the data onwards across the network, only one repeater node transmits the upstream data received directly from the mobile device. In addition should a network include several mobile devices, without specifying to which repeater node a mobile device is transmitting data the network may become very inefficient due to excessive radio interference. Furthermore, the power with which the mobile device 1 transmits data need only be sufficient to ensure that it is received by one (most likely the closest) repeater node.

In one example, transmissions of the data by the repeater nodes using the first transmission power must be received by at least one other repeater node in order for the network formed by the repeater nodes to function. Therefore coverage areas formed for the transmission of the data overlap and include neighbouring repeater nodes.

In the arrangement shown in FIG. 4, should the mobile device 1 move to a location within the hashed area 47 or the cross hatched area 48, as described above it is within the coverage areas of at least three repeater nodes. In either of these cases there will be a choice of repeater nodes from which to select a repeater node to which the mobile device 1 transmits upstream data. It would be possible for the mobile device 1 to simply compare the relative strengths of a signal each repeater node transmits during its allocated time slot and from this chose the strongest signal and thus select the repeater node that transmitted the strongest signal. However, as discussed above this has a number of drawbacks and may be particularly difficult if the coverage area provided by each repeater node when transmitting at a full power is so great that most if not all of the network is within a communication range of any repeater node.

Figure 5:
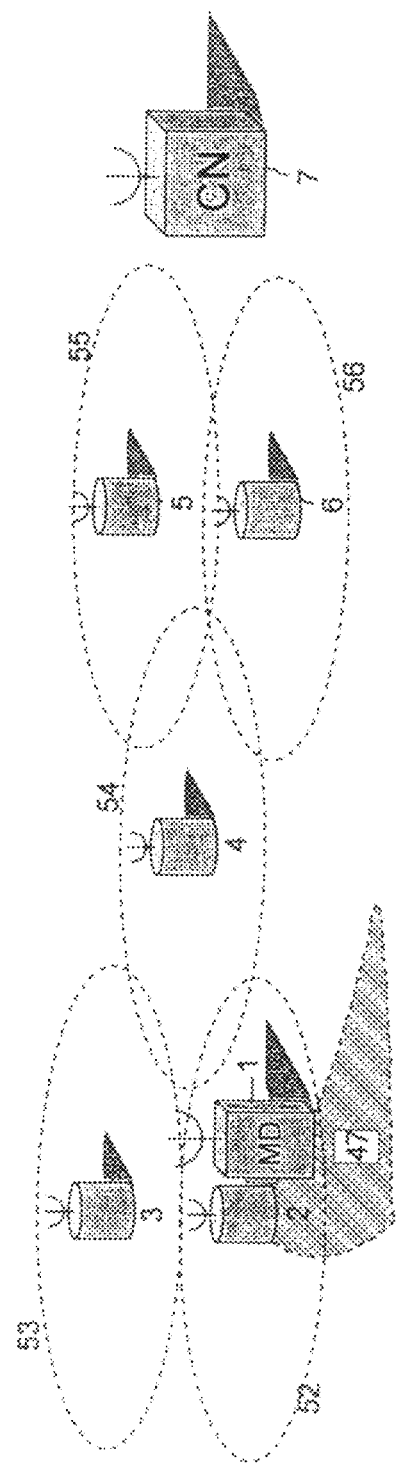
FIG. 5 provides a simplified diagram of reduced power coverage areas provided by repeater nodes according to an embodiment of the present invention.

According to the present invention during a specified time slot all of the repeater nodes 2, 3, 4, 5, 6 transmit a pilot signal. The pilot signal is of a reduced power when compared to the power with which data is transmitted by the repeater nodes 2, 3, 4, 5, 6. FIG. 3 shows the time slot TS7 during which the repeater nodes 2, 3, 4, 5, 6 transmit the pilot signal. FIG. 5 shows coverage areas 52, 53, 54, 55, 56 provided by the repeater nodes 2, 3, 4, 5, 6 when transmitting at the reduced power. As will be seen when comparing FIGS. 4 and 5, as the coverage area of each repeater node is reduced, the size of areas of the network where there is coverage by more than one repeater node is reduced. The hashed area 47 from FIG. 4 indicating an area of the network within the coverage area 42 of the first repeater node 2, the coverage area 43 provided by a second repeater node 3 and the coverage area 46 provided by the third repeater node 6 is transposed onto FIG. 5 for reference. It can be seen from FIG. 5 that the location of the mobile device 1 is such that during the pilot signal time slot TS7 the mobile device 1 is only in the coverage area 52 provided by repeater node 2. However, as the mobile device 1 is in the hashed area 47, during the remaining parts of the time frame when the repeater nodes are at full transmitting power, the mobile device will be in the coverage areas of at least three repeater nodes.

As can be seen from FIG. 5, because the pilot signal is transmitted at a reduced power, the mobile device 1 will only be within a coverage area provided by a repeater node if the mobile device is relatively near the repeater node. As will be understood this makes determining which repeater node is providing the strongest signal to the mobile device 1 much easier to determine. Furthermore, because every repeater node transmits the pilot signal at the same time, i.e. during time slot TS7, then the mobile device 1 need only be in a pilot signal receiving mode for a period of time equivalent to a time period of the time frame $t_1$. When the repeater nodes transmit the pilot signal, they are operable to include an identifier in the pilot signal. The identifier is different for each repeater node and enables the mobile device to determine which repeater nodes have sent the pilot signals which it has received. For example in FIG. 5, the mobile device would be able to determine that it has received a pilot signal from the first repeater node 2.

Once the time slot TS7 is complete and the mobile device 1 has received all the pilot signals from repeater nodes that are in range, the mobile device 1 is operable to determine from which repeater node it has received the strongest pilot signal and select that repeater node as the repeater node to which the mobile device 1 will transmit upstream data and receive downstream data. In the arrangement shown in FIG. 5, the mobile device 1 will select the first repeater node 2. In some embodiments the radio interface used by the network includes a spread spectrum modulation scheme. By use of a spread spectrum scheme detecting the strongest pilot signal at the mobile device is quite simple to achieve. As will be understood, a property of spread spectrum transmission is that stronger signals will tend to suppress the reception of weaker signals by increasing the level of noise across the spectrum (this is also the case for other modulation schemes). Therefore if a repeater node is for example very close to the mobile device 1, the pilot signal from that repeater node will not only be stronger but it will also act to suppress the reception of pilot signals from other repeater nodes.

In some embodiments the identifier included in the pilot signal from each repeater node includes an indication of the time slot which has been allocated to the repeater node of the time frame 31. Therefore in FIG. 1, the mobile device 1 would receive the pilot signal from the first repeater node 2 and also an indication that the first repeater node 2 transmits data during the time slot TS1. By including an indication of the time slot, the mobile device may be operable to reduce power consumption further by powering receiving parts of its transceiver unit 10 only during the time slot allocated to the selected repeater node and during the time slot TS7 when the pilot signals are transmitted.

During a normal operation it would be expected that the mobile device 1 will move from location to location within the network. Embodiments described above allow for a "seamless handover" from repeater node to repeater node in which the mobile device 1 can change the selected repeater node without any active participation required from the repeater nodes or any other part of the network, such as the control node 7. This is because the mobile device 1 can move from location to location, determining during the pilot signal time slot TS7 the repeater node with which it shares the strongest communication link and then activating the receiving parts of its transceiver unit 10 during the time slot allocated to the selected repeater node. This is shown in FIG. 6.

Figure 6:
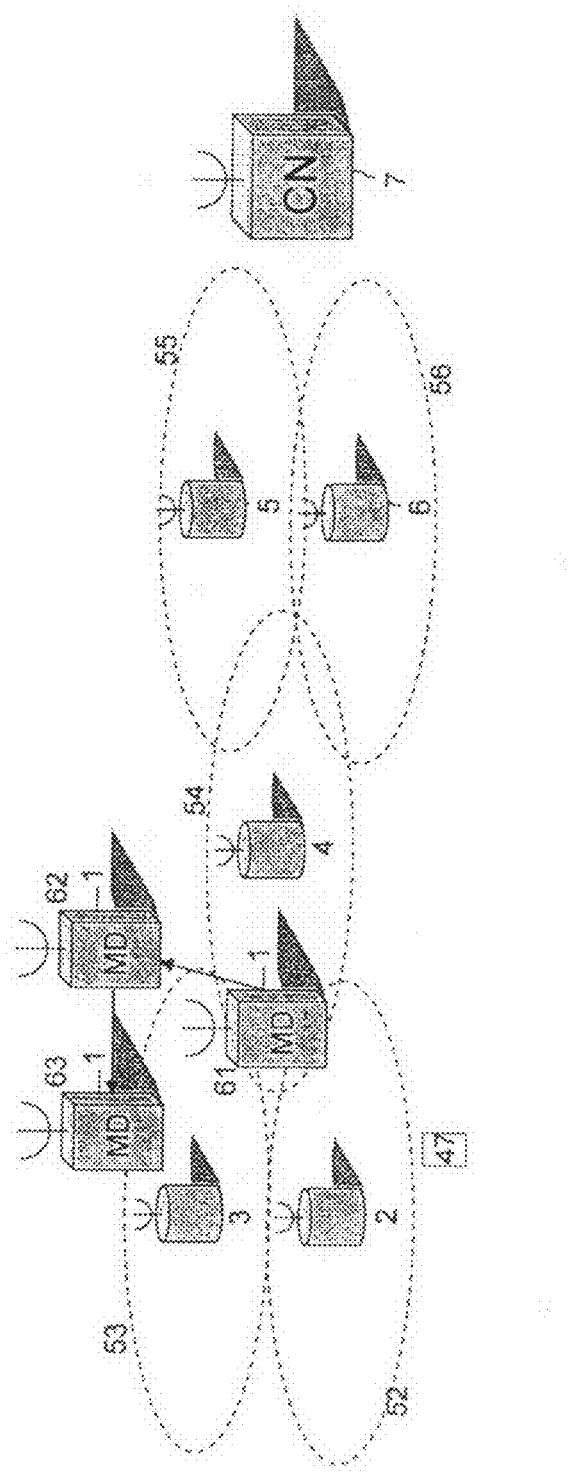
FIG. 6 shows the diagram of FIG. 5 including an illustration of a path taken by a mobile device.

FIG. 6 shows the network in FIG. 5 but including a path 64 which the mobile device takes through the network. A first point 61, a second point 62 and a third point 63 are shown indicating the location of the mobile device 1 during pilot signal timeslots TS7 of the time frame 31. At the first point 61 the mobile device is in the pilot coverage areas of the first repeater node 2 and the third repeater node 4. Therefore during the pilot signal time slot TS7 the mobile device 1 will receive pilot signals from both the first repeater node 2 and the third repeater node 4 and will select whichever repeater node provides the strongest signal. At the second point 62 the mobile device is not in any pilot signal coverage area. In such situations, in some embodiments the mobile device 1 will simply continue to use the most recently selected repeater node. In the example shown in FIG. 6 this will be either the first repeater node 2 or the second repeater node 4. At the third point 63 the mobile device 1 is only in the pilot signal coverage area 53 of the second repeater node 3 and will therefore select this repeater node.

As disclosed in co-pending UK Application number 0614074.3 in some embodiments of the invention, the repeater nodes 2, 3, 4, 5, 6 are operable to transmit a location signal at a third power which is of a further reduced power when compared with the power of the pilot signal. FIG. 7 shows coverage areas 72, 73, 74, 75, 76 provided by the repeater nodes 2, 3, 4, 5, 6 when transmitting the location signal. Although not shown in FIG. 3, the location signal may be transmitted by each repeater node at the same time during a designated time slot in a similar way to the transmission of the pilot signal during time slot TS8 of the time frame 31.

As shown in FIG. 7, the transmission of the location signal at the further reduced power is such that there will be little or no substantial overlap between the coverage areas 72, 73, 74, 75, 76 of the repeater nodes 2, 3, 4, 5, 6. If the transceiver unit 10 of the mobile device 1 can receive a location signal transmitted from a repeater node, this indicates that the mobile device 1 is within a coverage area provided by a repeater node transmitting at the further reduced power. The system can therefore use this to determine a location of the mobile device 1. For example, the repeater nodes 2, 3, 4, 5, 6, shown in FIG. 7 might be distributed throughout a building with each repeater node being placed in a separate room. The repeater nodes may be associated with the specific room in which they are located for example the first repeater node 2 could be in a kitchen. As illustrated in FIG. 7, because the mobile device is within a coverage area 72 of the location signal of the first repeater node 2 this indicates that the mobile device 1 is in the kitchen. The mobile device 1 may then be operable to send a message to the control node via the repeater nodes indicating that it is presently in the kitchen.

Various modifications may be made to the embodiments herein before described. For example, although embodiments of the invention have been described with reference to nodes which transmit data via a wireless interface, embodiments of the invention would find equal application using communication schemes in which communication between nodes is achieved using a non-wireless interface for example a wired Ethernet connection.

The invention claimed is:

1. A telecommunications system for communicating data to and from a mobile device, the system comprising
a plurality of repeater nodes disposed to form a network, each repeater node having a transceiver unit operable to transmit the data with a first transmission power to one or more others of the repeater nodes within one of a plurality of time slots of a time frame, each repeater node being allocated by a control node one of the time slots of the time frame to transmit and to receive the data in downlink communications from the control node to the mobile device and in uplink communications from the mobile device to the control node, wherein
each of the repeater nodes is operable to transmit a pilot signal during a same one of the time slots of the time frame on a same frequency channel with a second transmission power, the second power being less than the first transmission power, the pilot signal including an identifier of the repeater node that transmitted the pilot signal, and
the mobile device is operable to receive one of the pilot signals transmitted from one of the repeater nodes, to detect the identifier included in the pilot signal received from the one repeater node, and to transmit and to receive the data to and from the repeater node identified by the identifier, wherein the mobile device is operable to select a timeslot in which to transmit and to receive the data based upon the pilot signal received from the one repeater node.

2. A telecommunications system according to claim 1, wherein
the pilot signal transmitted by each repeater node includes an indication of the time slot of the time frame used by the repeater node which transmitted the pilot to transmit and to receive the data.

3. A telecommunications system according to claim 1, wherein
the mobile device is operable to be in a data receiving mode only during the time slot used by the repeater node identified by the identifier to transmit the data and the time slot during which each of the repeater nodes transmit the pilot signal.

4. A telecommunications system according to claim 1, wherein
if the mobile device does not receive the pilot signal during the same one of the time slots during which the repeater nodes transmit the pilot signal, the mobile device is operable to transmit and to receive the data to and from the repeater node which the mobile device last received the pilot signal.

5. A telecommunications system according to claim 2, wherein
the mobile device is operable to be in a data receiving mode only during the time slot used by the repeater node identified by the identifier to transmit the data and the time slot during which each of the repeater nodes transmit the pilot signal.

6. A telecommunications system according to claim 2, wherein
if the mobile device does not receive the pilot signal during the same one of the time slots during which the repeater nodes transmit the pilot signal, the mobile device is operable to transmit and to receive the data to and from the repeater node which the mobile device last received the pilot signal.

7. A telecommunications system according to claim 3, wherein
if the mobile device does not receive the pilot signal during the same one of the time slots during which the repeater nodes transmit the pilot signal, the mobile device is operable to transmit and to receive the data to and from the repeater node which the mobile device last received the pilot signal.

8. A telecommunications system according to claim 1, wherein
the repeater nodes are located at intermediate points within the network between the mobile device and the control node such that the repeater nodes are only indirectly coupled to any subsequent networks coupled to the network.

9. A method of communicating data to and from a mobile device in a network which includes a plurality of repeater nodes and a control node, the method comprising
transmitting the data from each of the repeater nodes with a first transmission power to one or more others of the plurality of repeater nodes within one of a plurality of time slots of a time frame, each repeater node being allocated by the control node a different time slot of the time frame to transmit and to receive the data in downlink communications from the control node to the mobile device and in uplink communications from the mobile device to the control node,
transmitting a pilot signal from each repeater node during a same one of the time slots of the time frame on a same frequency channel with a second transmission power, the second power being less than the first transmission power, the pilot signal including an identifier of the repeater node that transmitted the pilot signal, and
receiving one of the pilot signals at the mobile device transmitted from one of the repeater nodes,
detecting the identifier included in the pilot signal received from the one repeater node,
selecting a timeslot in which to transmit and to receive the data based upon the pilot signal received from the one repeater node, and
transmitting and receiving the data to and from the repeater node identified by the identifier at the mobile device.

10. A method according to claim 9, wherein
the pilot signal transmitted by each repeater node includes an indication of the time slot of the time frame used by the repeater node which transmitted the pilot signal to transmit and to receive the data.

11. A method according to claim 9, wherein
the mobile device is operable to be in a data receiving mode only during the time slot used by the repeater node identified by the identifier to transmit the data and the time slot during which each of the repeater nodes transmit the pilot signal.

12. A method according to claim 9, wherein
if the mobile device does not receive the pilot signal during the same one of the time slots during which the repeater nodes transmit the pilot signal, the mobile device is operable to transmit and to receive the data from the repeater node which the mobile device last received the pilot signal.

13. A method according to claim 10, wherein
if the mobile device does not receive the pilot signal during the same one of the time slots during which the repeater nodes transmit the pilot signal, the mobile device is operable to transmit and to receive the data to and from the repeater node which the mobile device last received the pilot signal.

14. A method according to claim 11, wherein
if the mobile device does not receive the pilot signal during the same one of the time slots during which the repeater nodes transmit the pilot signal, the mobile device is operable to transmit and to receive the data to and from the repeater node which the mobile device last received the pilot signal.

15. A method according to claim 10, wherein
the mobile device is operable to be in a data receiving mode only during the time slot used by the repeater node identified by the identifier to transmit the data and the time slot during which each of the repeater nodes transmit the pilot signal.

16. A repeater node for communicating data in a telecommunications system, the repeater node comprising
a transceiver unit operable to transmit and to receive the data to or from one or more others of a plurality of repeater nodes, a control node and a mobile device within one of a plurality of time slots of a time frame in downlink communications from the control node to the mobile device and in uplink communications from the mobile device to the control node, wherein
the transceiver unit is operable to transmit the data with a first transmission power to the one or more of the repeater nodes within the one of a plurality of time slots of the time frame, and
the transceiver unit is operable to transmit a pilot signal during a second time slot of the time frame with a second transmission power, the second power being less than the first transmission power, the pilot signal including an identifier of the repeater node which transmitted the pilot signal.

17. A mobile device for communicating data in a telecommunications system, the mobile device comprising
a transceiver unit operable to transmit and to receive the data to or from one or more of a plurality of repeater nodes in downlink communications from the control node to the mobile device and in uplink communications from the mobile device to the control node, wherein
the transceiver unit is operable to transmit the data to one of the repeater nodes within one of a plurality of time slots of a time frame, and
the transceiver unit is operable to
receive a pilot signal transmitted from one of the repeater nodes during a second time slot of the time frame, the pilot signal including an identifier of the repeater node that transmitted the pilot signal,
to detect the identifier included in the pilot signal received from the one repeater node,
to select a timeslot in which to transmit and to receive the data based upon the pilot signal received from the one repeater node, and
to transmit and to receive the data to and from the repeater node identified by the identifier.

18. An apparatus for communicating data to and from a mobile device in a network which includes a plurality of repeater nodes and a control node, the apparatus comprising
means for transmitting the data from each of the plurality of repeater nodes with a first transmission power to one or more others of the plurality of repeater nodes within one of a plurality of time slots of a time frame, each repeater node being allocated a different time slot of the time frame by the control node,
means for transmitting and receiving the data to and from one or more of the repeater nodes from and to the mobile device in downlink communications from the control node to the mobile device and in uplink communications from the mobile device to the control node,
means for transmitting a pilot signal from each repeater node during the same one of the time slots of the time frame on a same frequency channel with a second transmission power, the second power being less than the first transmission power, the pilot signal including an identifier of the repeater node that transmitted the pilot signal, and means for receiving the pilot signal at the mobile device transmitted from one of the repeater nodes, means for detecting the identifier included in the pilot signal received from the one repeater node at the mobile device, means for selecting a timeslot in which to transmit and to receive the data based upon the pilot signal received from the one repeater node at the mobile device, and means for transmitting and receiving the data to and from the repeater node identified by the identifier at the mobile device.

\* \* \* \* \*